United States Patent
Swain et al.

(10) Patent No.: US 12,373,021 B2
(45) Date of Patent: Jul. 29, 2025

(54) METHOD AND SYSTEM FOR AMBIENT INTELLIGENCE BASED USER INTERACTION

(71) Applicant: Tata Consultancy Services Limited, Mumbai (IN)

(72) Inventors: Amit Swain, Kolkata (IN); Chirabrata Bhaumik, Kolkata (IN); Brojeshwar Bhowmick, Kolkata (IN); Avik Ghose, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 356 days.

(21) Appl. No.: 18/304,569

(22) Filed: Apr. 21, 2023

(65) Prior Publication Data

US 2024/0103607 A1 Mar. 28, 2024

(30) Foreign Application Priority Data

Sep. 28, 2022 (IN) .............................. 202221055450

(51) Int. Cl.
| | | |
|---|---|---|
| *G06F 3/01* | (2006.01) | |
| *G01S 17/89* | (2020.01) | |
| *G06T 5/00* | (2024.01) | |
| *G06T 5/70* | (2024.01) | |
| *G06T 7/10* | (2017.01) | |
| *G06T 7/70* | (2017.01) | |
| *G06V 40/10* | (2022.01) | |

(52) U.S. Cl.
CPC .............. *G06F 3/011* (2013.01); *G01S 17/89* (2013.01); *G06T 5/70* (2024.01); *G06T 7/10* (2017.01); *G06T 7/70* (2017.01); *G06V 40/10* (2022.01)

(58) Field of Classification Search
None
See application file for complete search history.

(56) References Cited

U.S. PATENT DOCUMENTS 10,481,696 B2 11/2019 Molchanov et al.
2020/0090339 A1* 3/2020 Doemling ............ G06V 10/426
(Continued)

OTHER PUBLICATIONS

Dibitonto, Massimiliano, "New Challenges in HCI: Ambient Intelligence for Human Performance Improvement", Date: 2012, Link: https://iris.unica.it/retrieve/e2f56ed8-4792-3eaf-e053-3a05fe0a5d97/PhD_Dibitonto_Massimiliano.pdf.

*Primary Examiner* — Thomas D Lee
(74) *Attorney, Agent, or Firm* — Finnegan, Henderson, Farabow, Garrett & Dunner, LLP

(57) ABSTRACT

This disclosure relates generally to system and method for ambient intelligence based user interaction. Prior methods for touchless user interaction are sensitive to ambient temperature in a lab environment, susceptible to noise from metallic surfaces and ambient radio waves and are dependent on ambient lighting. Embodiments of the present disclosure provides a multi-modal sensor fusion method which captures touchless gestures from a user or a group of users with their physical context information fused and tagged to these gestures for user interaction. Further pose graphs are generated for user interaction systems using a data association technique and Gaussian mixture model technique. The disclosed method provides a hands-free interface to operate instruments in a smart space, using principles of ambient intelligence.

15 Claims, 11 Drawing Sheets

(56) References Cited

U.S. PATENT DOCUMENTS

2020/0293116 A1     9/2020   Udall et al.
2021/0158547 A1*    5/2021   He ......................... G01S 17/89
2022/0365186 A1*    11/2022  Schwiesow ............... G06T 7/97

* cited by examiner

METHOD AND SYSTEM FOR AMBIENT INTELLIGENCE BASED USER INTERACTION

PRIORITY CLAIM

This U.S. patent application claims priority under 35 U.S.C. § 119 to: Indian Patent Application No. 202221055450, filed on 28 Sep. 2022. The entire contents of the aforementioned application are incorporated herein by reference.

TECHNICAL FIELD

The disclosure herein generally relates to user interaction, and, more particularly, to method and system for ambient intelligence based user interaction.

BACKGROUND

A system based on ambient intelligence is a class of systems that combine multiple modalities like vision, speech and wearables to provide seamless intelligence to users. Ambient Intelligence is new multidisciplinary paradigm which changes the relation between humans, technology and the environment they live in. Ambient intelligence tends to change some human's activities by automating certain task. A smart environment is where a user can operate a set of instruments in the surrounding using gesture and speech. To enable such smart environment, a combination of technologies is needed to work in tandem to enable ubiquitous interactions. In the smart environment, a set of terminals may be shared between multiple users. The users might be wearing masks and lab protective gowns which will render their faces illegible to a vision based system. Hence face recognition and/or iris scanning cannot be used in these cases with a robust outcome.

In case of several user interaction environments such as operating rooms, demo centers which provide hands-free demos to customers/clients, known methods such as infrared (IR) based methods, radar based methods are not susceptible to be used. IR based methods are sensitive to ambient temperature in a lab environment. Haptic gloves cannot be used in sterile and lab environments as sensors may themselves get contaminated or cause contamination. Radar based techniques are susceptible to noise from metallic surfaces and from ambient radio waves. They are also limited by their measured range. Vision based techniques are dependent on ambient lighting and when hand has no color diversity owing to suite etc., they may not work properly. In privacy protected spaces such as operating rooms, cleanrooms and other private indoor spaces vision based techniques restricts its utility. For few user interaction systems proximity of users is important for detecting their presence, and hence proximity sensors need to be utilized. In some prior works for user interaction, radar based gesture recognition involves training to learn a template of radar signatures from a small, defined set of users carrying out different gestures. This approach is prone to physical similarities between two users and depends on gait differences for person identification.

SUMMARY

Embodiments of the present disclosure present technological improvements as solutions to one or more of the above-mentioned technical problems recognized by the inventors in conventional systems. For example, in one embodiment, a method for ambient intelligence based user interaction is provided. The method includes: receiving (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction; obtaining a set of point cloud by filtering the set of raw point cloud; computing a set of point clusters from the set of point cloud using a segmentation algorithm, wherein each point cluster comprises a cluster center and an XY coordinate; converting the set of point clusters to a set of tagged sub point clouds based on a cost matrix and a data association algorithm; segmenting the set of tagged sub point clouds to obtain a set of tagged sub point cloud segments corresponding to a plurality of body parts of the set of users; and generating a set of pose graphs corresponding to the set of tagged sub point cloud segments using a Gaussian Mixture Model technique, wherein the pose graph is being utilized for user interaction.

In another aspect, a system for ambient intelligence based user interaction is provided. The system comprises memory storing instructions; one or more communication interfaces; and one or more hardware processors coupled to the memory via the one or more communication interfaces, wherein the one or more hardware processors are configured by the instructions to receive (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction; obtain a set of point cloud by filtering the set of raw point cloud; compute a set of point clusters from the set of point cloud using a segmentation algorithm, wherein each point cluster comprises a cluster center and an XY coordinate; convert the set of point clusters to a set of tagged sub point clouds based on a cost matrix and a data association algorithm; segment the set of tagged sub point clouds to obtain a set of tagged sub point cloud segments corresponding to a plurality of body parts of the set of users; and generate a set of pose graphs corresponding to the set of tagged sub point cloud segments using a Gaussian Mixture Model technique, wherein the pose graph is being utilized for user interaction.

In an embodiment, wherein the step of converting the set of point clusters to the set of tagged sub point clouds comprises computing a Euclidean distance vector between the set of XY coordinates and the set of cluster centers; obtaining the cost matrix from the Euclidean distance vector and the set of tag IDs; and obtaining the set of tagged sub point clouds by applying the data association algorithm on the cost matrix.

In an embodiment, wherein the set of raw point cloud is filtered by removing noise and background information from the set of raw point cloud.

In an embodiment, wherein the user interaction is a touchless user interaction.

In an embodiment, wherein the step of generating the set of pose graphs comprises, obtaining a set of first point cloud corresponding to the set of tagged sub point cloud segments by projecting the XY coordinate of the set of tagged sub point cloud segments; down sampling the set of first point cloud to obtain a set of second point cloud; applying the Gaussian mixture model technique on the set of second point cloud to obtain a set of gaussian clusters and a set of gaussian means and performing a topological based data analysis on the set of gaussian clusters and the set of gaussian means to generate the set of pose graphs.

In yet another aspect, there is provided a computer program product comprising a non-transitory computer readable medium having a computer readable program embodied therein, wherein the computer readable program, when executed on a computing device causes the computing device for ambient intelligence based user interaction by receiving (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction; obtaining a set of point cloud by filtering the set of raw point cloud; computing a set of point clusters from the set of point cloud using a segmentation algorithm, wherein each point cluster comprises a cluster center and an XY coordinate; converting the set of point clusters to a set of tagged sub point clouds based on a cost matrix and a data association algorithm; segmenting the set of tagged sub point clouds to obtain a set of tagged sub point cloud segments corresponding to a plurality of body parts of the set of users; and generating a set of pose graphs corresponding to the set of tagged sub point cloud segments using a Gaussian Mixture Model technique, wherein the pose graph is being utilized for user interaction.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
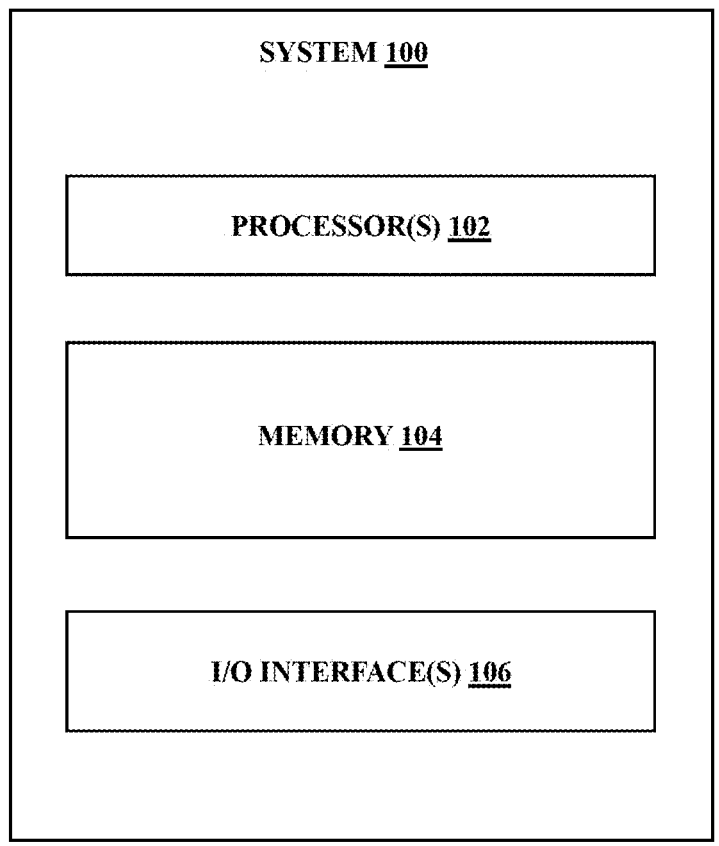
FIG. 1 illustrates an exemplary block diagram of a system for ambient intelligence based user interaction according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments of the present disclosure, provides a user interaction system based on hands-free paradigm using principles of ambient intelligence. The user interaction system enables smart spaces where content and interfaces can be personalized to a user, or a group of users based on context derived from location, proximity and so on. A smart environment where a user can operate a set of instruments using gesture and speech has been considered for the disclosed method. A set of terminals may be shared between multiple users and hence, location context is used to understand which user is operating the terminal and based on that personalized content and user interface (UI) is loaded. A wearable Ultra-wideband (UWB) tag is used for location and identity. Also, it has been considered that the users might be wearing masks and lab protective gowns which will render their faces illegible to a vision based system and hence face recognition and/or iris scanning cannot be used in these cases with a robust outcome.

The embodiments of the present disclosure provide a robust any body part detection method using Light Detection and Ranging (LiDAR) sensor data aided by a real time locating system sensor data positioning. In the current disclosure, Ultra-wideband (UWB) sensors are used for location positioning of the users. The disclosed method provides a body part detection method using LiDAR that avoids interference from neighborhood using location context. The current disclosure is explained on hand gesture recognition using LiDAR; however, it may be noted that it is not limited to hand gesture detection only but any body part detection of the user. The present disclosure is a multimodal user interaction wherein any number of multimodal sensor data (audio, vision based and so on) can be fused and used for user interaction systems. The existing prior methods are intrusive however, the disclosed method is non-intrusive. The user interaction system considered in the present disclosure is a touchless user interaction system.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 illustrates an exemplary block diagram of a system 100 for ambient intelligence based user interaction according to some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
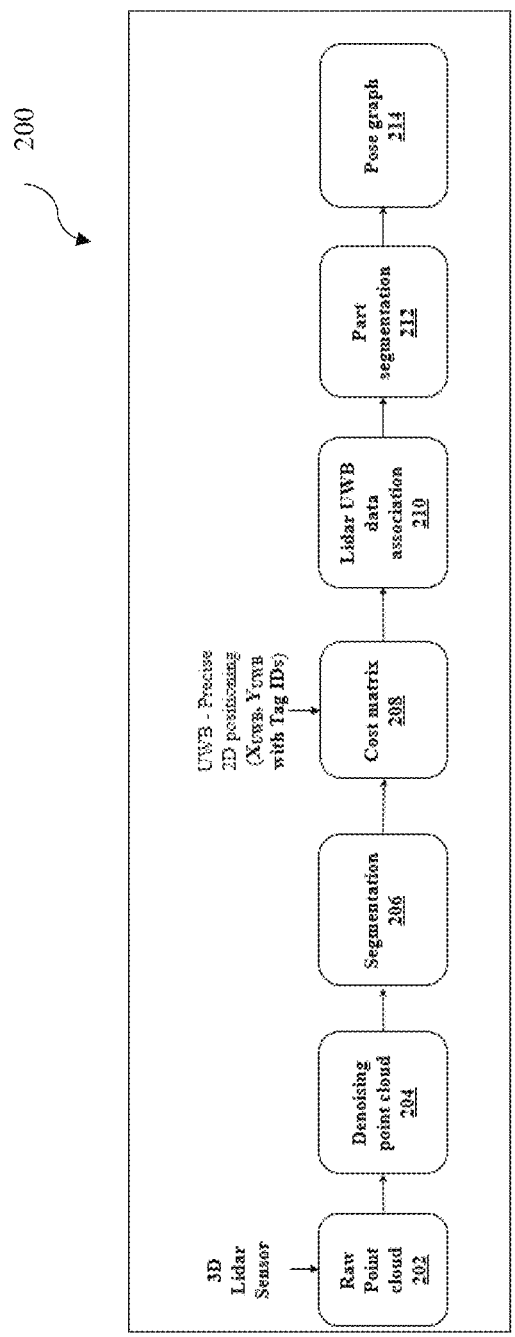
FIG. 2 is an exemplary block diagram of the system for ambient intelligence based user interaction in accordance with some embodiments of the present disclosure.

FIG. 2 is an exemplary block diagram of the system 100 for ambient intelligence based user interaction in accordance with some embodiments of the present disclosure. A raw point cloud 202 corresponding to a set of users is obtained from a 3D LiDAR sensor. Further the raw point cloud 202 is denoised by removing the noise to obtain a denoised point cloud 204. Then, segmentation 206 is performed on the denoised point cloud to obtain segmented point cloud. Further a cost matrix 208 is obtained using the UWB data (position coordinates of users) and the segmented point cloud. This cost matrix is used for further mapping the UWB data and the LiDAR data by performing a Lidar UWB data association 210 to obtain mapped segmented point cloud. Further, part segmentation 212 is done on the mapped segmented point cloud to obtain point cloud corresponding to human parts and then pose graphs 214 corresponding to these point clouds are generated for utilizing for user interaction. FIG. 2 is explained in a detailed manner using the steps illustrated in FIG. 3A through FIG. 3C.

Figure 3A:
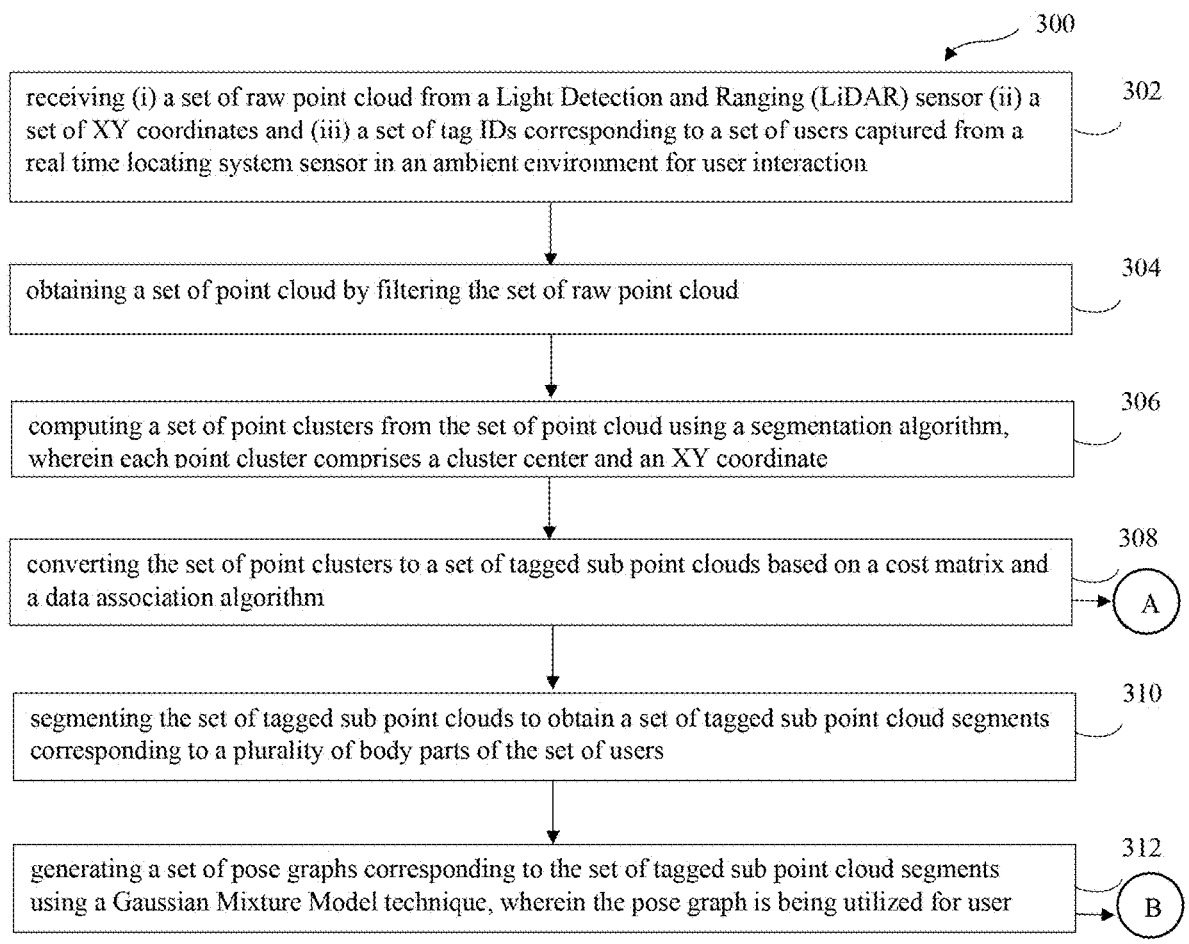
FIG. 3A through FIG. 3C is an exemplary flow diagram illustrating a method for ambient intelligence based user interaction according to some embodiments of the present disclosure.
Figure 3B:
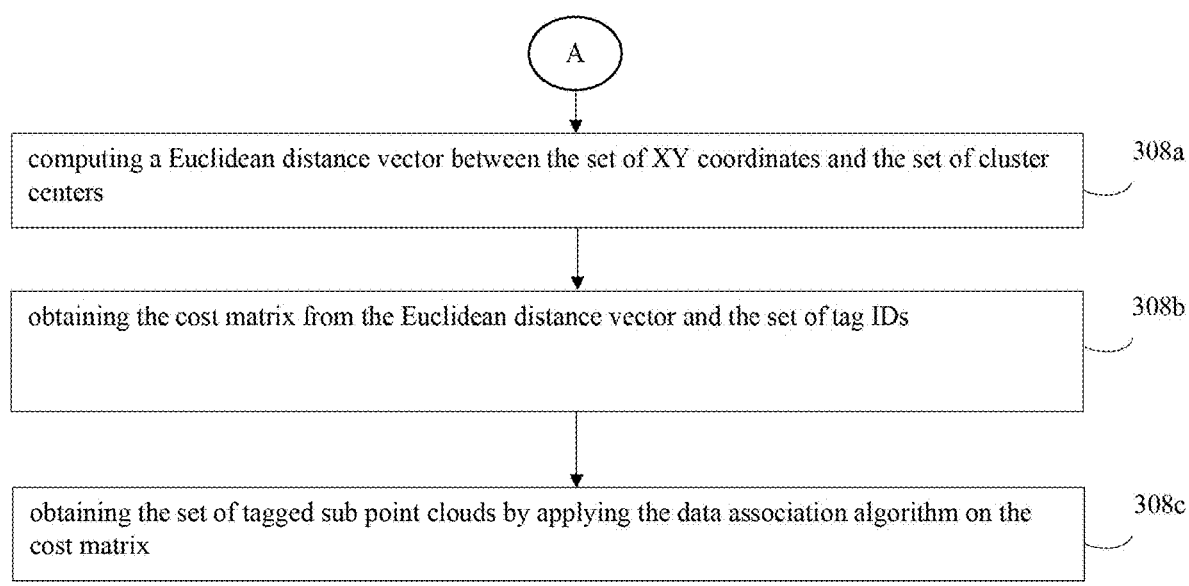
Figure 3C:
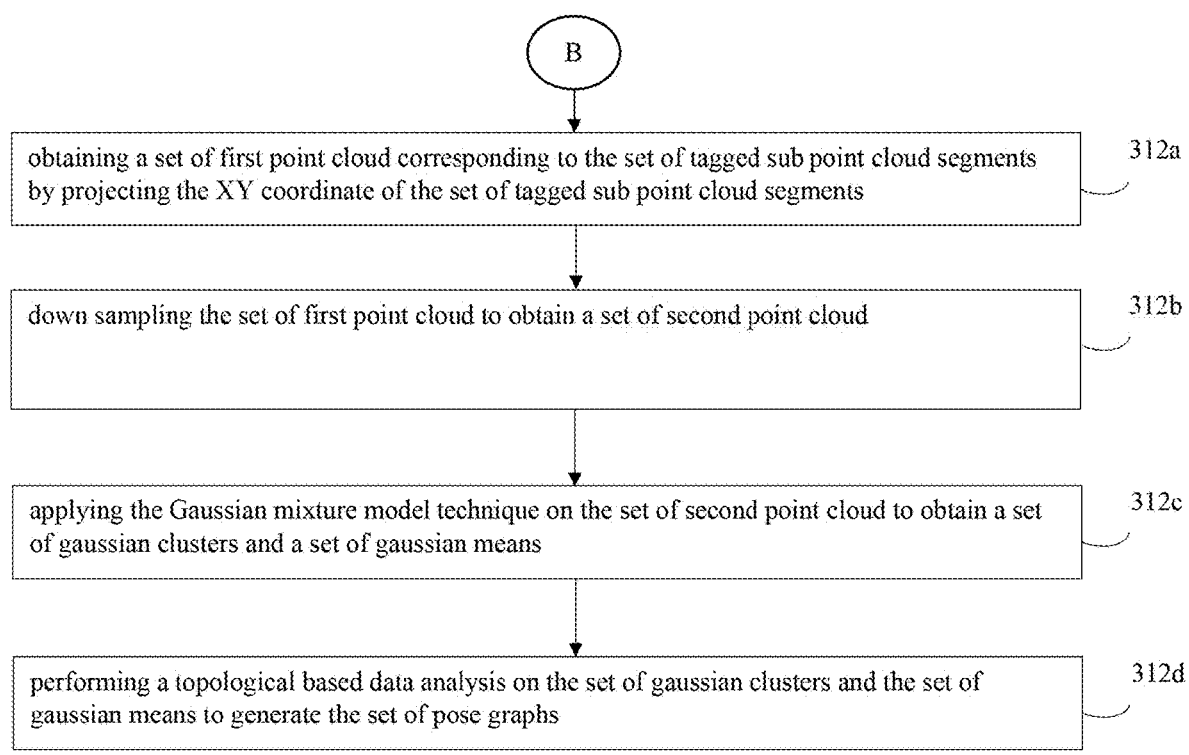
Figure 4:
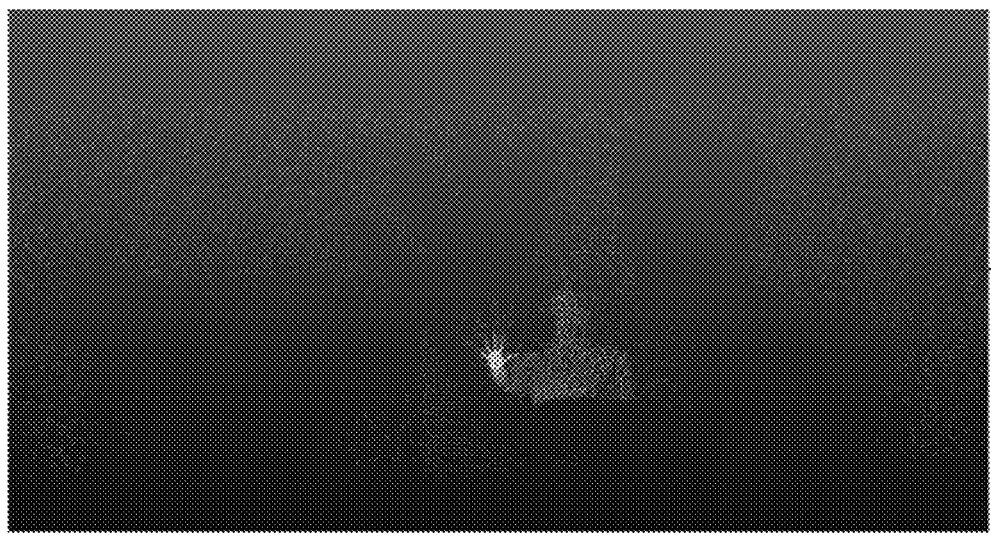
FIG. 4 depicts an example of a raw point cloud from a Light Detection and Ranging (LiDAR) sensor in accordance with some embodiments of the present disclosure.

FIG. 3A through FIG. 3C is an exemplary flow diagram illustrating a method for ambient intelligence based user interaction according to some embodiments of the present disclosure. In an embodiment of the present disclosure, the one or more processors 102 are configured to receive at step 302, (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction. Multiple frames of the sparse LiDAR data are clubbed to generate a near-dense raw point cloud. The real time locating system sensor such as an Ultra-wideband (UWB) sensor is used for capturing the set of XY coordinates and the set of tag IDs corresponding to the set of users. It is not limited to UWB sensors, however any other real time locating system sensor can be used as well. Prior methods are being used for localization and capturing XY coordinates of the set of users. FIG. 4 depicts an example of a raw point cloud from a LiDAR sensor in accordance with some embodiments of the present disclosure.

Figure 5:
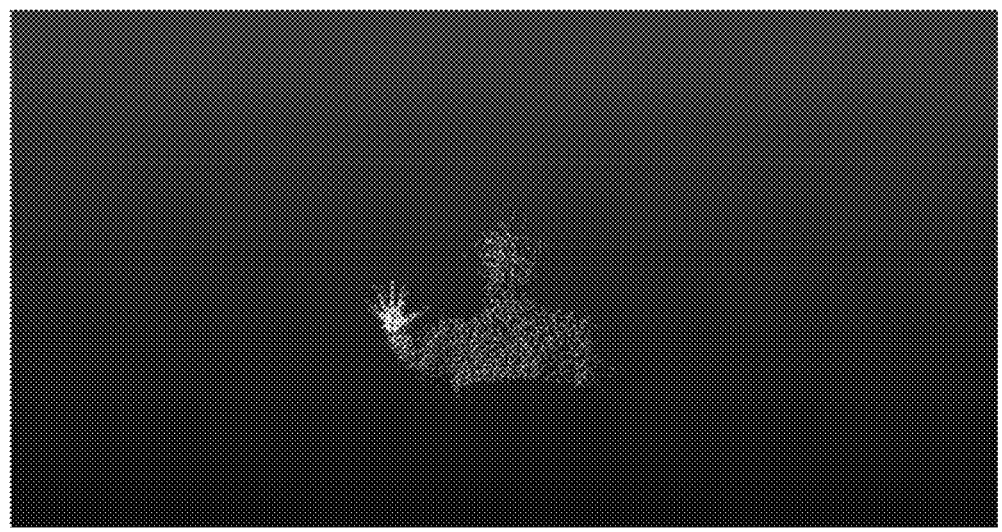
FIG. 5 depicts an example of point cloud after noise removal from the raw point cloud in accordance with some embodiments of the present disclosure.

In an embodiment of the present disclosure, the one or more processors 102 are configured to obtain at step 304, a set of point cloud by filtering the set of raw point cloud. The set of raw point cloud is filtered by removing noise and background information from the set of raw point cloud. Any state-of-the-art methods for removal of noise and background information can be used for this step. For example, filter-based methods, optimization-based methods and deep learning-based methods. In the present disclosure, a statistical noise filter with parameters as neighborhood points, standard deviation and a threshold has been used. FIG. 5 depicts an example of point cloud after noise removal from the raw point cloud in accordance with some embodiments of the present disclosure.

Figure 6:
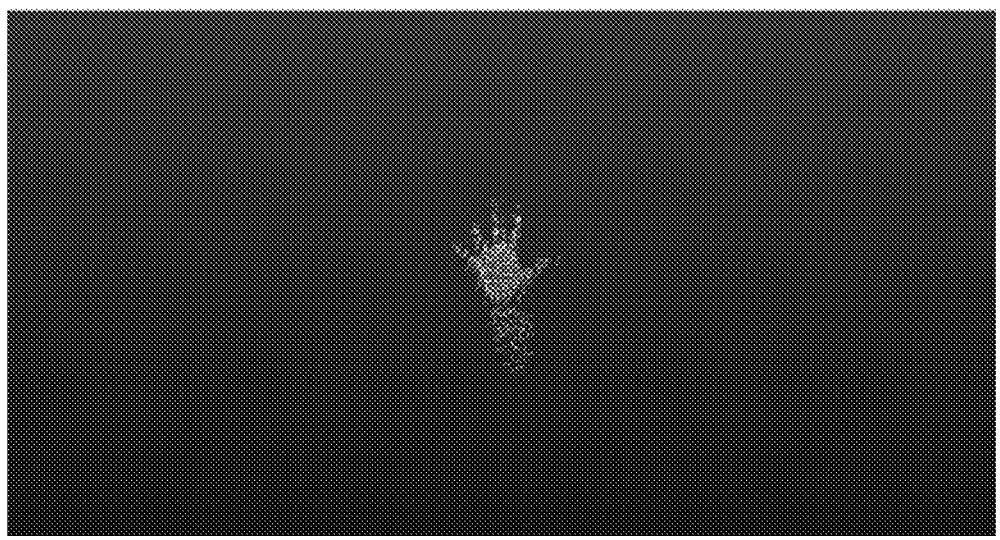
FIG. 6 depicts an example of point cloud associated with a segmented body part in accordance with some embodiments of the present disclosure.

In an embodiment of the present disclosure, the one or more processors 102 are configured to compute at step 306, a set of point clusters from the set of point cloud using a segmentation algorithm. Here, each point cluster from the set of point clusters comprises a cluster center and an XY coordinate. In the present disclosure, an octree segmentation algorithm with parameters like octree grid step, minimum points per component have been used. FIG. 6 depicts an example of point cloud associated with a segmented body part in accordance with some embodiments of the present disclosure.

In an embodiment of the present disclosure, the one or more processors 102 are configured to convert at step 308, the set of point clusters to a set of tagged sub point clouds based on a cost matrix and a data association algorithm. The step of converting the set of point clusters to a set of tagged sub point clouds is performed using a set of steps. The main task is to map the set of point clusters to the point clouds and tagging them accordingly. The tagging of point clouds is done using the Euclidean distances between the UWB location coordinates and the estimated cluster centers of the set of point clusters. At step 308a, a Euclidean distance vector is computed between the set of XY coordinates and the set of cluster centers. Further at step 308b, the cost matrix is obtained from the computed Euclidean distance vector and the set of tag IDs. Finally, at step 308c, the set of tagged sub point clouds is obtained by applying the data association algorithm on the cost matrix. The data association algorithm such as Munkres optimization algorithm is being used here UWB/LiDAR data association. However, it may not be limited to Munkres optimization algorithm, any data association algorithm can be used. For example, Table 1 shows the cost matrix obtained from a set of cluster centers $C_i$ and UWB location coordinates $L_i$. The cost values are estimated based on the Euclidean distance between the cluster centers and the UWB location.

TABLE 1

|  | $C_1$ | $C_2$ | $C_3$ | $C_4$ | $C_5$ |
|---|---|---|---|---|---|
| $L_1$ | 12 | 15 | 13 | 14 | 15 |
| $L_2$ | 16 | 18 | 15 | 14 | 16 |
| $L_3$ | 18 | 16 | 15 | 18 | 20 |
| $L_4$ | 15 | 20 | 18 | 17 | 19 |
| $L_5$ | 16 | 15 | 18 | 14 | 15 |

After executing Munkres optimization on the same cost matrix, the optimal mapping for this instance is:
C1→L4
C2→L3
C3→L1
C4→L2
C5→L5

Figure 7:
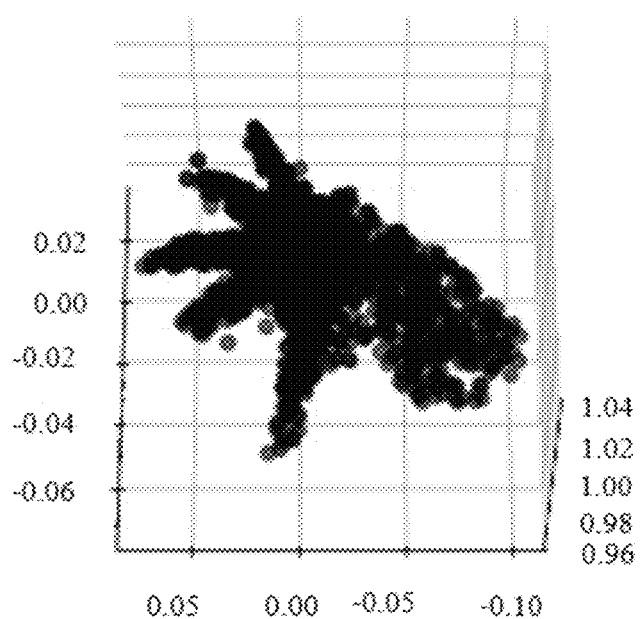
FIG. 7 depicts an example of a hand point cloud in accordance with some embodiments of the present disclosure.
Figure 8:
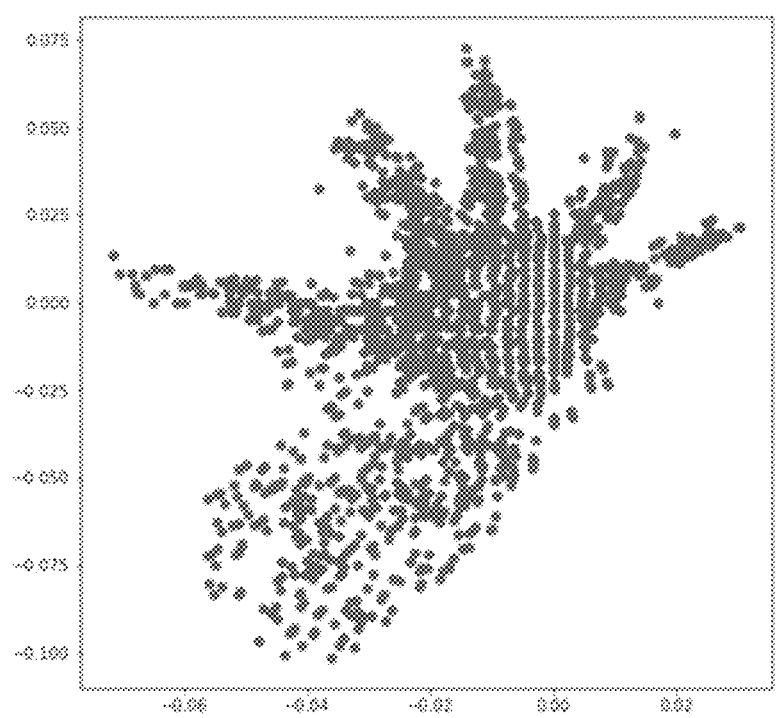
FIG. 8 depicts an example of projection of hand point cloud on XY plane in accordance with some embodiments of the present disclosure.

In an embodiment of the present disclosure, the one or more processors 102 are configured to segment at step 310, the set of tagged sub point clouds to obtain a set of tagged sub point cloud segments corresponding to a plurality of body parts of the set of users. This is done using the XY coordinate associated with each user. FIG. 7 depicts an example of a hand point cloud in accordance with some embodiments of the present disclosure. FIG. 8 depicts an example of projection of hand point cloud on XY plane in accordance with some embodiments of the present disclosure.

Figure 9:
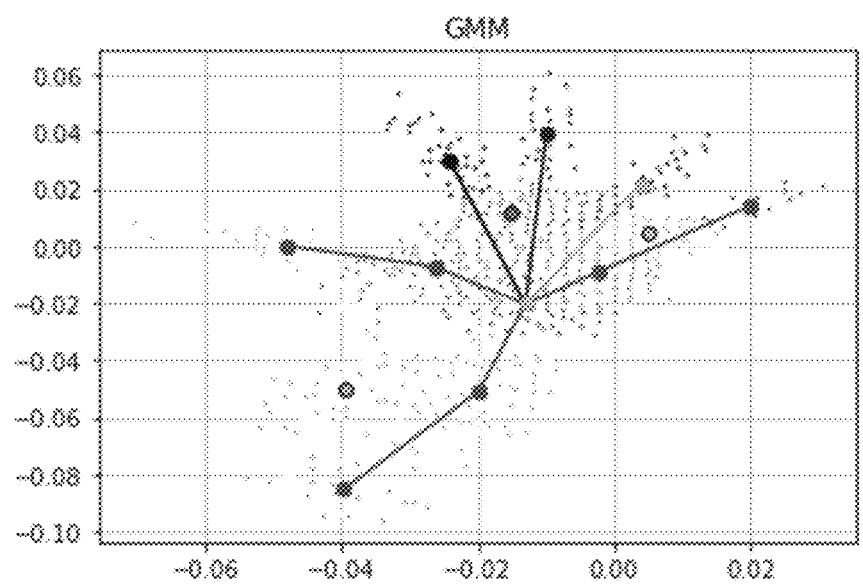
FIG. 9 depicts an example of a pose graph generated using Gaussian Mixture Model technique in accordance with some embodiments of the present disclosure.

In an embodiment of the present disclosure, the one or more processors 102 are configured to generate at step 312, a set of pose graphs corresponding to the set of tagged sub point cloud segments using a Gaussian Mixture Model technique, wherein the pose graph is being utilized for user. In the present disclosure, a GMM-TDA (Topological data analysis) based lightweight method has been used to generate hand pose graphs for each tagged cluster. The set of steps for generating the set of pose graphs corresponding to the set of tagged sub point cloud segments is being explained below. At step 312a, a set of first point cloud corresponding to the set of tagged sub point cloud segments is obtained by projecting the XY coordinate of the set of tagged sub point cloud segments. Further at step 312b, the set of first point cloud is down sampled to obtain a set of second point cloud. The Gaussian mixture model technique is applied at step 312c on the set of second point cloud to obtain a set of gaussian clusters and a set of gaussian means. Finally at step 312d, a topological based data analysis is performed on the set of gaussian clusters and the set of gaussian means to generate the set of pose graphs. FIG. 9 depicts an example of a pose graph generated using Gaussian Mixture Model technique in accordance with some embodiments of the present disclosure.

The algorithm for pre-processing the raw point cloud which depicts in the steps 302 to 310 is provided below as Algorithm 1. The algorithm for generating pose graphs which depicts in the step 312 is provided below as Algorithm 2.

and swifter gesture recognition. Furthermore, the inclusion of location prior and LiDAR/UWB data association channelizes the data processing for individual sub point clouds, reducing the complexity in multi-user scenario. Hence the disclosed method provides a contextual, ubiquitous, personalized, and hands-free interface to operate instruments in a smart space, using principles of ambient intelligence.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure provide an ambient intelligence based user interaction system. The embodiments provide a method for mapping a set of point clouds associated with multiple users to a set of UWB location coordinates using a cost matrix and data association algorithm. The mapped point clouds are then further segmented to obtain a set of segmented point clouds associated to body parts of users. And further to develop pose graphs which is being utilized for user interaction systems.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g.,

---

Algorithm 1: Algorithm for Pre-processing Raw Data

```
1:   procedure PRE-PROCESS(rawCloud, priors (position = X, Y, tagIDs))
2:       cloud noiseFilter(Input = rawCloud, neighbours = 6, sigma = 1)
3:       pts, numClusters, clusterCenters ← octreeSegmentation(Input = cloud,
         octreeLevel = 8, minPts = 10)
4:       while n < (numClusters)2 do
5:           cost[n] ← eucledianDistance(clusterCenters, priors[position])
6:       costMatrix ← cost, priors[tagIDs]
7:       taggedCluster ← munkresOptimization(costMatrix)
8:       while n < numClusters do
9:           filtPts ← depthThreshold(taggedCluster, priors[position])
10:          handPts ← partSegmentation(filtPts)
11:      return handPts
```

---

Algorithm 2: Algorithm for Generating Pose Graph using GMM-TDA

```
1:   procedure GENERATE-POSE(handPts)
2:       inputCloud ← xyProjection(handPts)
3:       processCloud ← downSample(inputCloud)
4:       gmmClusters,gmmMeans ← gaussian MixtureModel(processCloud,
         nComponents = 13, randomState = 0)
5:       poseGraph ← tdaMapper(gmmClusters, gmmMeans)
6:       return poseGraph
```

---

EXPERIMENTATION RESULTS: During experimentation, even with use of low cost and sparse LiDAR, the fingers of the users were clustered and pose graph was generated from the relevant cluster centers. Now, the coordinates of these nodes in the pose graph can be used for tracking hand key points. The same, when mapped to a set of gestures in a look-up table/database enables lightweight any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
   receiving, via one or more hardware processors, (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction;
   obtaining, via the one or more hardware processors, a set of point cloud by filtering the set of raw point cloud;
   computing, via the one or more hardware processors, a set of point clusters from the set of point cloud using a segmentation algorithm, wherein each point cluster comprises a cluster center and an XY coordinate;
   converting, via the one or more hardware processors, the set of point clusters to a set of tagged sub point clouds based on a cost matrix and a data association algorithm;
   segmenting, via the one or more hardware processors, the set of tagged sub point clouds to obtain a set of tagged sub point cloud segments corresponding to a plurality of body parts of the set of users; and
   generating, via the one or more hardware processors, a set of pose graphs corresponding to the set of tagged sub point cloud segments using a Gaussian Mixture Model technique, wherein the pose graph is being utilized for user interaction.

2. The method of claim 1, wherein the step of converting the set of point clusters to the set of tagged sub point clouds comprises:
   computing a Euclidean distance vector between the set of XY coordinates and the set of cluster centers;
   obtaining the cost matrix from the Euclidean distance vector and the set of tag IDs; and
   obtaining the set of tagged sub point clouds by applying the data association algorithm on the cost matrix.

3. The method of claim 1, wherein the set of raw point cloud is filtered by removing noise and background information from the set of raw point cloud.

4. The method of claim 1, wherein the user interaction is a touchless user interaction.

5. The method of claim 1, wherein the step of generating the set of pose graphs comprises,
   obtaining a set of first point cloud corresponding to the set of tagged sub point cloud segments by projecting the XY coordinate of the set of tagged sub point cloud segments;
   down sampling the set of first point cloud to obtain a set of second point cloud;
   applying the Gaussian mixture model technique on the set of second point cloud to obtain a set of gaussian clusters and a set of gaussian means; and
   performing a topological based data analysis on the set of gaussian clusters and the set of gaussian means to generate the set of pose graphs.

6. A system, comprising:
   a memory storing instructions;
   one or more communication interfaces; and
   one or more hardware processors coupled to the memory via the one or more communication interfaces, wherein the one or more hardware processors are configured by the instructions to:
      receive (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction;
      obtain a set of point cloud by filtering the set of raw point cloud;
      compute a set of point clusters from the set of point cloud using a segmentation algorithm, wherein each point cluster comprises a cluster center and an XY coordinate;

convert the set of point clusters to a set of tagged sub point clouds based on a cost matrix and a data association algorithm;

segment the set of tagged sub point clouds to obtain a set of tagged sub point cloud segments corresponding to a plurality of body parts of the set of users; and generate a set of pose graphs corresponding to the set of tagged sub point cloud segments using a Gaussian Mixture Model technique, wherein the pose graph is being utilized for user interaction.

7. The system of claim 6, wherein the one or more hardware processors are configured to convert the set of point clusters to the set of tagged sub point clouds by:

computing a Euclidean distance vector between the set of XY coordinates and the set of cluster centers;

obtaining the cost matrix from the Euclidean distance vector and the set of tag IDs; and obtaining the set of tagged sub point clouds by applying the data association algorithm on the cost matrix.

8. The system of claim 6, wherein the set of raw point cloud is filtered by removing noise and background information from the set of raw point cloud.

9. The system of claim 6, wherein the user interaction is a touchless user interaction.

10. The system of claim 6, wherein the one or more hardware processors are configured to generate the set of pose graphs by, obtaining a set of first point cloud corresponding to the set of tagged sub point cloud segments by projecting the XY coordinate of the set of tagged sub point cloud segments;

down sampling the set of first point cloud to obtain a set of second point cloud;

applying the Gaussian mixture model technique on the set of second point cloud to obtain a set of gaussian clusters and a set of gaussian means; and performing a topological based data analysis on the set of gaussian clusters and the set of gaussian means to generate the set of pose graphs.

11. One or more non-transitory machine-readable information storage mediums comprising one or more instructions which when executed by one or more hardware processors cause:

receiving, (i) a set of raw point cloud from a Light Detection and Ranging (LiDAR) sensor (ii) a set of XY coordinates and (iii) a set of tag IDs corresponding to a set of users captured from a real time locating system sensor in an ambient environment for user interaction;

obtaining a set of point cloud by filtering the set of raw point cloud;

computing a set of point clusters from the set of point cloud using a segmentation algorithm, wherein each point cluster comprises a cluster center and an XY coordinate;

converting the set of point clusters to a set of tagged sub point clouds based on a cost matrix and a data association algorithm;

segmenting the set of tagged sub point clouds to obtain a set of tagged sub point cloud segments corresponding to a plurality of body parts of the set of users; and generating a set of pose graphs corresponding to the set of tagged sub point cloud segments using a Gaussian Mixture Model technique, wherein the pose graph is being utilized for user interaction.

12. The one or more non-transitory machine-readable information storage mediums of claim 11, wherein the step of converting the set of point clusters to the set of tagged sub point clouds comprises:

computing a Euclidean distance vector between the set of XY coordinates and the set of cluster centers;

obtaining the cost matrix from the Euclidean distance vector and the set of tag IDs; and obtaining the set of tagged sub point clouds by applying the data association algorithm on the cost matrix.

13. The one or more non-transitory machine-readable information storage mediums of claim 11, wherein the set of raw point cloud is filtered by removing noise and background information from the set of raw point cloud.

14. The one or more non-transitory machine-readable information storage mediums of claim 11, wherein the user interaction is a touchless user interaction.

15. The one or more non-transitory machine-readable information storage mediums of claim 11, wherein the step of generating the set of pose graphs comprises, obtaining a set of first point cloud corresponding to the set of tagged sub point cloud segments by projecting the XY coordinate of the set of tagged sub point cloud segments;

down sampling the set of first point cloud to obtain a set of second point cloud;

applying the Gaussian mixture model technique on the set of second point cloud to obtain a set of gaussian clusters and a set of gaussian means; and performing a topological based data analysis on the set of gaussian clusters and the set of gaussian means to generate the set of pose graphs.

* * * * *